United States Patent
Chen et al.

(10) Patent No.: US 7,353,315 B2
(45) Date of Patent: Apr. 1, 2008

(54) BUS CONTROLLER WITH VIRTUAL BRIDGE

(75) Inventors: Lin-Hung Chen, Taipei (TW); Jui-Ming Wei, Taipei (TW)

(73) Assignee: Via Technologies, Inc., Taipei (TW)

( * ) Notice: Subject to any disclaimer, the term of this patent is extended or adjusted under 35 U.S.C. 154(b) by 96 days.

(21) Appl. No.: 11/325,906

(22) Filed: Jan. 5, 2006

(65) Prior Publication Data
US 2006/0149886 A1 Jul. 6, 2006

(30) Foreign Application Priority Data
Jan. 5, 2005 (TW) .............................. 94100285 A

(51) Int. Cl.
*G06F 13/00* (2006.01)
(52) U.S. Cl. ...................... 710/311; 710/306
(58) Field of Classification Search ............... 710/306, 710/311
See application file for complete search history.

(56) References Cited

U.S. PATENT DOCUMENTS

2002/0073264 A1* 6/2002 George et al. .............. 710/305
2003/0005207 A1* 1/2003 Langendorf et al. ........ 710/306
2004/0064602 A1* 4/2004 George ........................ 710/22
2006/0010278 A1* 1/2006 Dennis et al. ............... 710/306
2006/0236016 A1* 10/2006 Tetrick ........................ 710/306

* cited by examiner

*Primary Examiner*—Glenn A. Auve
(74) *Attorney, Agent, or Firm*—Kirton & McConkie; Evan R. Witt

(57) ABSTRACT

A bus controller and a control method are used in a computer system. In a bus controller, a bus controller main circuit issues a first signal to the central processing unit in response to a bus configuration cycle for indicating the presence of a first-level bus that the first group of components is coupled to. A virtual bridge device issues a second signal to the central processing unit in response to the bus configuration cycle for indicating the presence of a second-level bus that the second group of components is coupled to. A path selection unit electrically connected to the first and second groups of components via the first-level and second-level buses, respectively, outputs a normal device select signal to one of the first-level and second-level buses while outputting an invalid device select signal to the other of the first-level and second-level buses according to address data of a transaction.

22 Claims, 5 Drawing Sheets

BUS CONTROLLER WITH VIRTUAL BRIDGE

FIELD OF THE INVENTION

The present invention relates to a bus controller and a bus control method, and more particularly to a bus controller and a bus control method for use in a computer system.

BACKGROUND OF THE INVENTION

Refer to FIG. 1, which is a functional block diagram illustrating a conventional peripheral interface configuration of a computer system, in which a PCI (peripheral controller interface) bus 12 connects to a core logic unit 11 generally comprising of a north bridge chip and a south bridge chip. A PCI controller controlling the operation of PCI bus 12 is integrated into the core logic unit 11, and a plurality of PCI devices 120 connects to the PCI bus 12. Generally, there are six slots available for each PCI bus to connect at most six PCI devices. When more than six PCI devices are required, a PCI-to-PCI bridge (P2P bridge) device is employed to interconnect two PCI buses so as to expand the PCI-device capacity. For example, in FIG. 1 twelve PCI devices can be connected to two PCI buses (PCI bus 12 and PCI bus 13) interconnected via a P2P bridge 121, and eighteen PCI devices can be connected to three PCI buses (PCI bus 12, PCI bus 13 and PCI bus 14) interconnected via two P2P bridges (P2P bridge 121 and P2P bridge 131). In such manner, the PCI bus configuration is arranged as a multi-level hierarchy.

Refer to FIG. 2, which is a functional block diagram illustrating another conventional peripheral interface configuration of a computer, in which the internal components and the external PCI components are connected to a common PCI bus. The core logic unit 11 communicates with various internal components 21 to 23 in addition to the external PCI devices 24 to 26 similar to the PCI devices 120 illustrated in FIG. 1. The internal components 21 to 23 and the external PCI devices 24 to 26 are all connected to a common PCI bus 20. Examples of the internal components include an AC97 audio chip 21, a serial ATA control chip 22 and a universal serial bus (USB) control chip 23. The common PCI bus 20 to the internal components 21 to 23 and the external PCI devices 24 to 26 would result in a resource contention problem on operation system (OS).

In order to solve the above problem, the internal components and the external PCI devices are preferably connected to different bus layers that are interconnected via a P2P bridge. Accordingly, another conventional peripheral interface configuration of a computer is developed and will be described hereinafter with reference to FIG. 3. In the PCI bus configuration of FIG. 3, the internal components including the AC97 audio chip 21, the serial ATA control chip 22 and the USB control chip 23 are connected to a PCI bus 30 at the upper level along with a P2P bridge 31. Whereas, the external PCI devices 24 to 26 are connected to a PCI bus 32 at the lower level and communicating with the PCI bus 30 via the P2P bridge 31. In this way, the bus resource can be well coordinated by the OS.

Although the multi-layer hierarchy of FIG. 3 is advantageous in resource coordination, such coordination needs compatible buffer management to work with because it takes time and actions to transmit the transaction issued by a lower-layer device to the upper-layer bus. The performance of the system is thus adversely affected. Moreover, since the P2P bridge 31 is independently in charge of the lower-level bus and devices, it has to include circuitry for executing operations such as address decoding, command decoding, data buffer management, debugging and/or priority arbitrating, and thus the hardware cost is increased.

SUMMARY OF THE INVENTION

The present invention provides a bus controller and a bus control method for use in a computer system to simplify the hardware circuitry while taking advantage of the multi-layer resource coordination.

The bus controller of a computer system of the present invention is employed for the communication of a central processing unit (CPU) with a first group of components and a second group of components. In the bus controller, a bus controller main circuit in communication with the CPU issues a first signal to the CPU in response to a bus configuration cycle for indicating the presence of a first-level bus that the first group of components is coupled to. A virtual bridge device in communication with the CPU issues a second signal to the CPU in response to the bus configuration cycle for indicating the presence of a second-level bus that the second group of components is coupled to. A path selection unit electrically connected to the first group of components and the second group of components via the first-level bus and the second-level bus, respectively outputs a normal device select signal to a specified one of the first-level bus and the second-level bus while outputting an invalid device select signal to the other of the first-level bus and the second-level bus in response to a transaction received by the bus controller main circuit and directed to the specified one of the first-level bus and the second-level bus.

The present invention also provides a bus controller of a computer system, via which a CPU communicates with a first group of components and a second group of components, wherein the bus controller comprises a bus controller main circuit electrically connected to the CPU; a virtual bridge device electrically connected to the CPU via the bus controller main circuit and electrically connected to the bus controller main circuit via an internal line; and a path selection unit electrically connected to the bus controller main circuit and communicable with the first group of components and the second group of components via a bus device. The path selection unit transfers a transaction to the first group of components via the bus device when a bus code carried by the transaction has a first value and transfers the transaction to the second group of components via the bus device when the bus code carried by the transaction has a second value.

The present invention further provides a bus control method for use in a computer system, wherein the computer includes a CPU, a bus controller main circuit, a virtual bridge device, a first group of components, and a second group of components. The bus control method comprises steps of: the bus controller main circuit indicating the presence of a first-level bus that the first group of components is coupled to and the virtual bridge device indicating the presence of a second-level bus that the second group of components is coupled to in response to a bus configuration cycle asserted when the computer system is initialized; outputting a normal select signal to the first-level bus when the address data of a transaction received by the bus controller main circuit indicates a bus code of the first-level bus; and outputting a normal select signal to the second-level bus when the address data of a transaction received by the bus controller main circuit indicates a bus code of the second-level bus.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Hereinafter, an embodiment of a bus controller and the bus control method according to the present invention will be illustrated with reference to FIG. 4 and FIG. 5.

Figure 4:
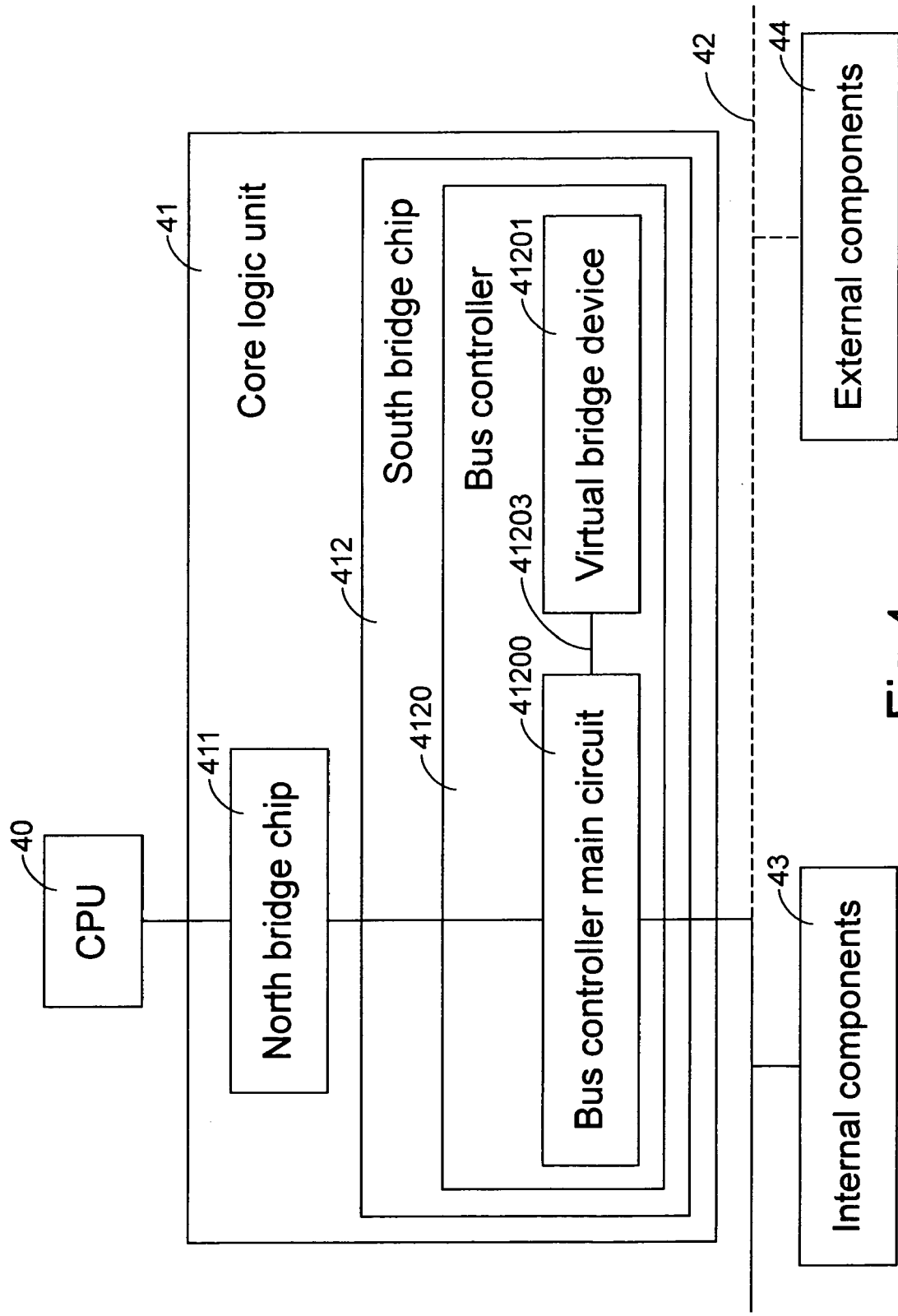
FIG. 4 is a functional block diagram illustrating a bus control architecture of a computer system according to a preferred embodiment of the present invention.

In FIG. 4, a core logic unit 41 including a north bridge chip 411 and a south bridge chip 412 controls data flows among a CPU 40 and a plurality of internal components 43 and external components 44 via a PCI bus 42. Examples of the internal components include AC97 audio chips, serial ATA control chips, USB control chips, etc. In this embodiment, the bus controller 4120 is integrated into the south bridge chip 412, and comprises a bus controller main circuit 41200 and a virtual bridge device 41201 interconnected via an internal line 41203.

When initializing the computer system, the operating system has the CPU 40 assert a bus configuration cycle to the bus controller main circuit 41200 and the virtual bridge device 41201, the bus controller main circuit 41200 thus responds to the bus configuration cycle with the presence of a bus controller for controlling a first-level bus in communication with the internal components, and the virtual bridge device 41201 responds to the bus configuration cycle with the presence of a P2P bridge for controlling a second-level bus in communication with the external components. The P2P bridge and second-level bus, in fact, are virtual and simulate the operations of physical P2P bridge and lower-level bus.

The virtual bridge device 41201 is implemented with a set of registers storing therein configuration header data of a PCI-to-PCI bridge device. When the operating system has the CPU 40 assert a bus configuration cycle to the virtual bridge device 41201, the virtual bridge device 41201 responds the configuration header data to the CPU so as to simulate a physical P2P bridge and a multi-level hierarchy in the computer system.

From the above descriptions, it is understood that a virtual multi-level hierarchy of the computer system can be constructed. Subsequently, the data transmission through the virtual multi-level hierarchy will be illustrated with reference to FIG. 5, in which an embodiment of a PCI controller 4120 is shown.

Figure 1:
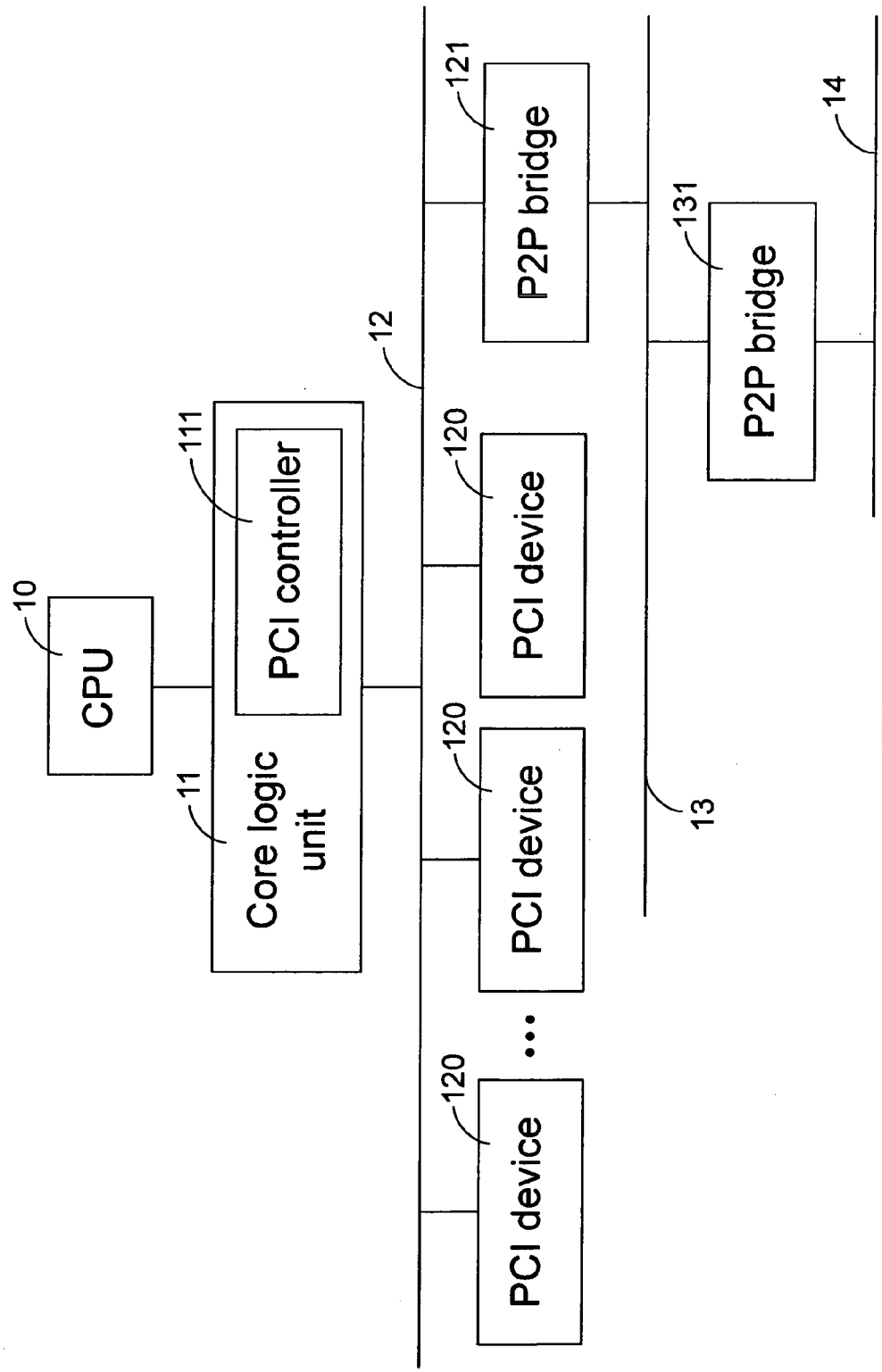
FIG. 1 is a functional block diagram illustrating a conventional peripheral interface configuration of a computer system, in which the external PCI devices are arranged in a multi-level hierarchy.
Figure 2:
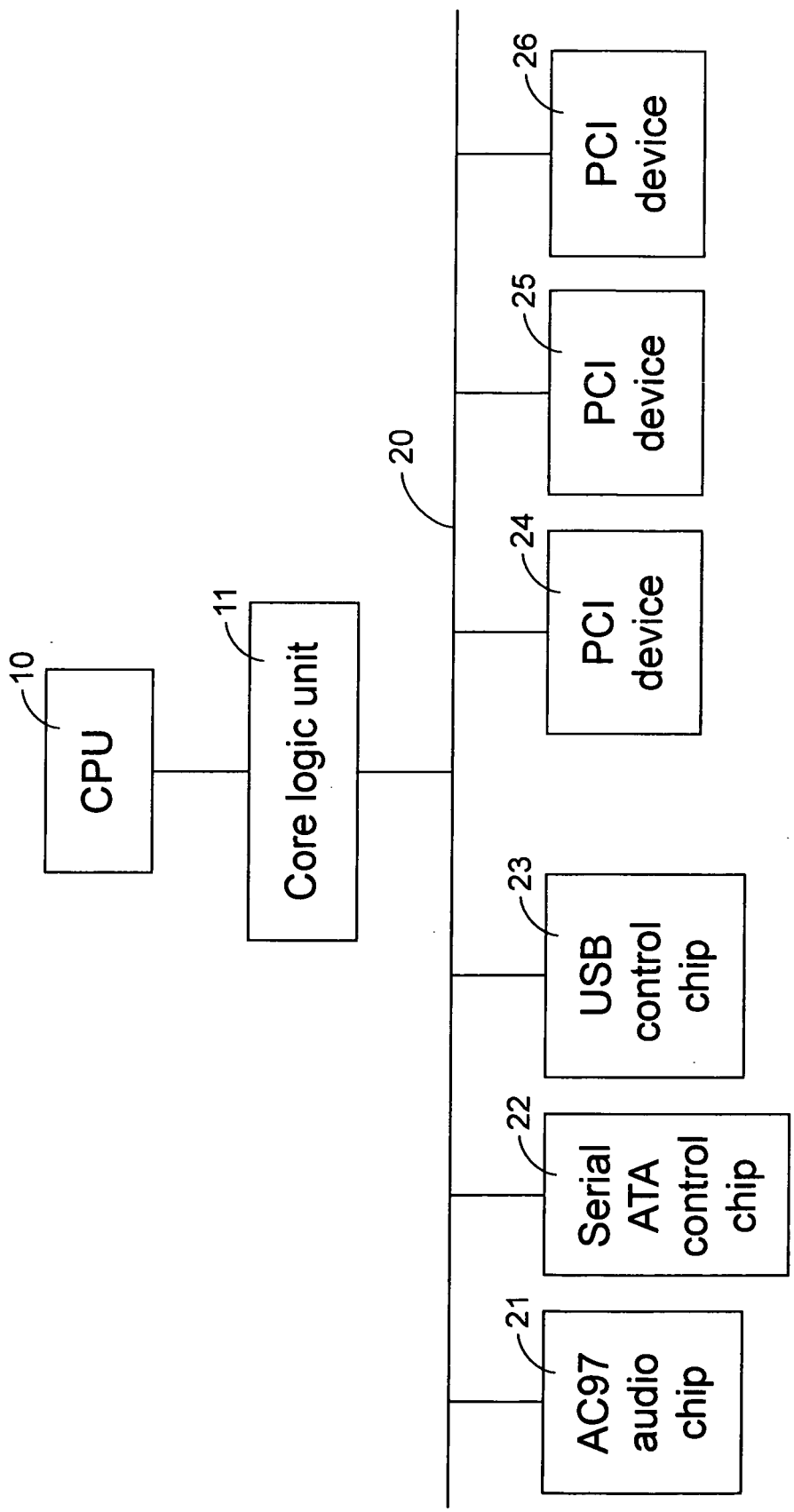
FIG. 2 is a functional block diagram illustrating another conventional peripheral interface configuration of a computer system, in which the internal components and the external PCI components are connected to a common PCI bus.
Figure 3:
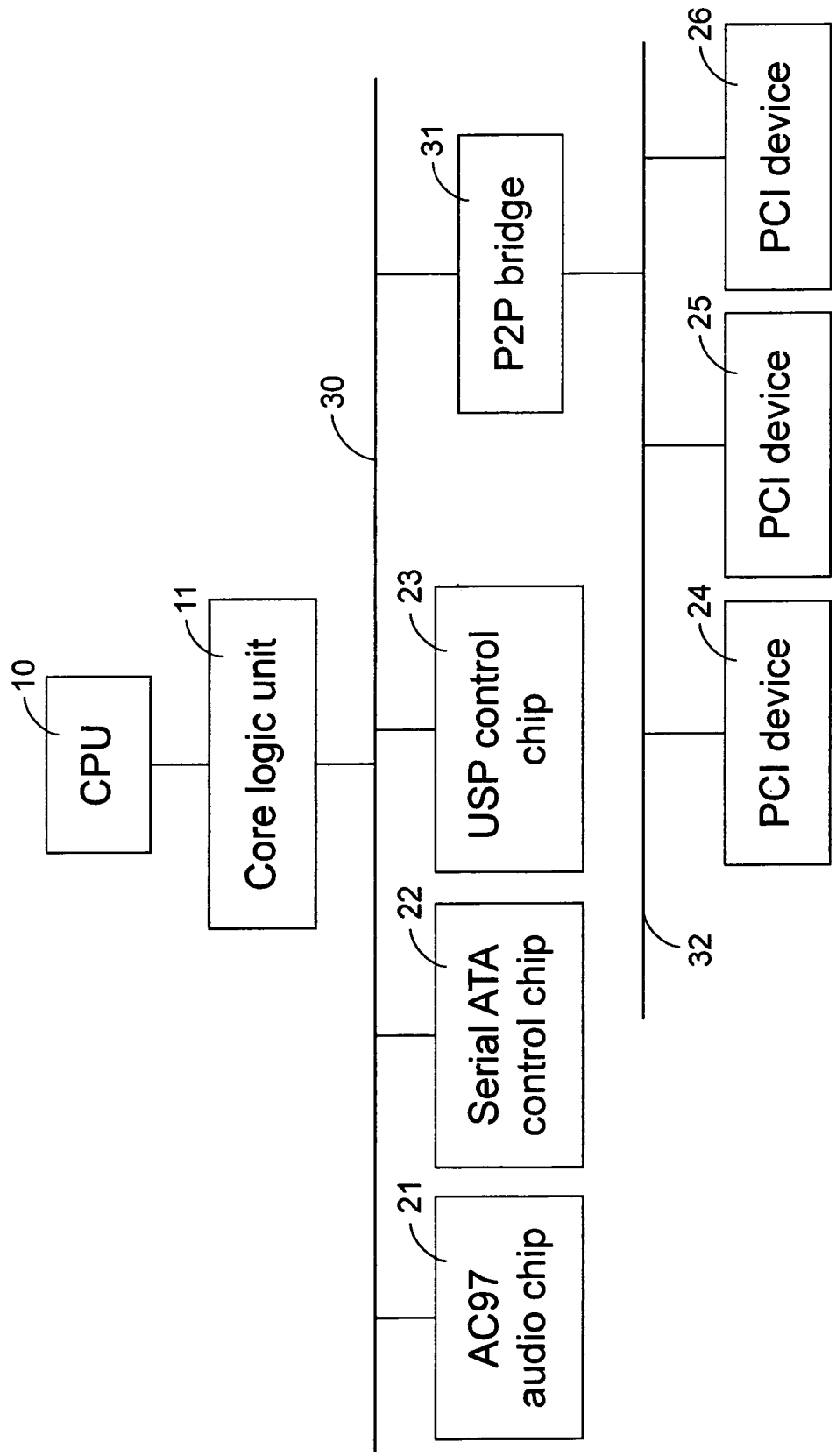
FIG. 3 is a functional block diagram illustrating another conventional peripheral interface configuration of a computer system, in which the internal components and the external PCI components are arranged in a multi-level hierarchy.
Figure 5:
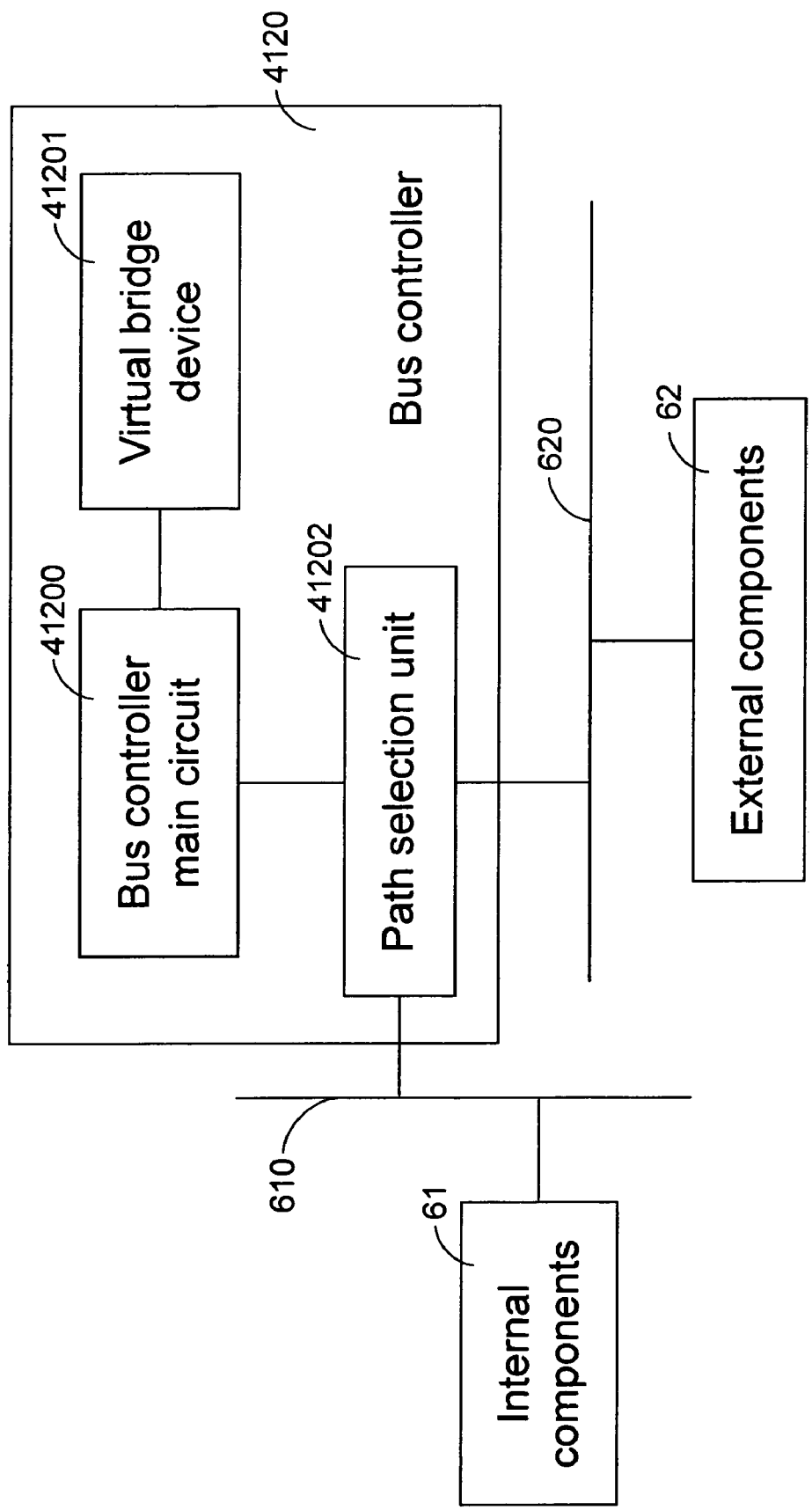
FIG. 5 is a functional block diagram illustrating a bus controller used in a computer system according to a preferred embodiment of the present invention.

In the embodiment of FIG. 5, the bus controller 4120 further comprises a path selection unit 41202 that can be implemented with a select mask for differentiating the signals received from the bus controller main circuit 41200, and the PCI bus interface includes two PCI buses 610 and 620 of the same physical levels functioning as different-level PCI buses in the virtual multi-level hierarchy. For example, the PCI bus 610 in communication with internal components 61 serves as an upper-level bus "0", and the PCI bus 620 in communication with external components 62 serves as a lower-level bus "N". The topological architecture of the PCI bus configuration is defined by the operating system while the computer system is initialized. Via such settings, all the detected P2P bridges (physical or virtual), PCI buses and internal/external components are defined as the architecture of FIG. 3. In this architecture, even if some internal component was given the same device code as some external component due to their presence in different bus levels, the bus controller would not be confused. The operations of this PCI controller will be described in more detail hereinafter.

When the operating system has the CPU 40 assert an I/O cycle to the bus controller 4120, the bus controller 4120 refers to the address data carried by the I/O cycle. The address data includes a bus code for identifying which bus is directed to and a device code for identifying which device is directed to. For example, when the operating system is to assert an I/O transaction to a specified one of the internal components 61, the address data of an I/O transaction will include a bus code "0" that is directed to the first-level bus 610 and a device code directed to that specified internal component. Then, the path selection unit 41202 outputs a device select signal corresponding to the device code to the first-level bus 610. In the meantime, the path selection unit 41202 also outputs the device select signal to the second-level bus 620 but the device select signal has been invalidated by the path selection unit 41202 for example by zeroing all the bits of the device select signal corresponding to the device code. On the other hand, when the operating system is to assert an I/O transaction to a specified one of the external components 62, the address data of an I/O transaction will include a bus code "N" that is directed to the second-level bus 620 and a device code directed to that specified external component. Then, the path selection unit 41202 outputs a device select signal corresponding to the device code to the second-level bus 620. In the meantime, the path selection unit 41202 also outputs the device select signal to the first-level bus 610 but the device select signal has been invalidated by the path selection unit 41202 for example by zeroing all the bits of the device select signal. In this manner, even if some internal component was given the same device code as some external component, only the specified internal component could realize the transaction when the address data includes a bus code "0" while only the specified external component could realize the transaction when the address data includes a bus code "N".

From the above description, it is understood that the bus controller and the bus control method of the present invention are capable of simulating a multi-level hierarchy of PCI bus configuration without the need of a physical PCI-to-PCI bridge device. Therefore, the hardware cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A bus controller of a computer system, via which a central processing unit communicates with a first group of components and a second group of components, the bus controller comprising:
    a bus controller main circuit in communication with the central processing unit, issuing a first signal to the central processing unit in response to a bus configuration cycle for indicating the presence of a first-level bus that the first group of components is coupled to; and
    a virtual bridge device in communication with the central processing unit, issuing a second signal to the central processing unit in response to said bus configuration cycle for indicating the presence of a second-level bus that the second group of components is coupled to.

2. The bus controller according to claim 1 further comprising:
    a path selection unit electrically connected to the first group of components and the second group of components via said first-level bus and said second-level bus respectively.

3. The bus controller according to claim 2 wherein the path selection unit outputs a normal device select signal to a specified one of said first-level bus and said second-level bus while outputting an invalid device select signal to the other of said first-level bus and said second-level bus in response to a transaction directed to said specified one of said first-level bus and said second-level bus.

4. The bus controller according to claim 3 wherein said transaction is directed to the first-level bus when a bus code carried by said transaction is a first value, and said transaction is directed to the second-level bus when a bus code carried by said transaction is a second value.

5. The bus controller according to claim 3 wherein said transaction further carries a device code, and said normal device select signal corresponds to said device code while said invalid device select signal corresponds to a change to said device code.

6. The bus controller according to claim 5 wherein said invalid device select signal includes a plurality of zeroed bits to correspond to said device code.

7. The bus controller according to claim 1 wherein an operating system of the computer has the central processing unit assert said bus configuration cycle to said bus controller main circuit and said virtual bridge device while the computer system is initialized.

8. The bus controller according to claim 1 wherein said first-level bus is closer to the central processing unit than said second-level bus.

9. The bus controller according to claim 1 wherein said virtual bridge device is implemented with a set of registers storing therein configuration header data of a physical PCI-to-PCI bridge device.

10. The bus controller according to claim 1 wherein the first group of components comprises at least one internal component selected from a group consisting of an AC97 audio chip, a serial ATA control chip and a USB control chip.

11. The bus controller according to claim 1 wherein the second group of components comprises at least one external PCI device.

12. A bus controller of a computer system, via which a central processing unit communicates with a first group of components and a second group of components, the bus controller comprising:
    a bus controller main circuit electrically connected to the central processing unit;
    a virtual bridge device electrically connected to the central processing unit via said bus controller main circuit and electrically connected to said bus controller main circuit via an internal line; and
    a path selection unit electrically connected to said bus controller main circuit and in communication with the first group of components and the second group of components via a bus device, said path selection unit transferring a transaction to the first group of components via said bus device when a bus code carried by said transaction has a first value and transferring said transaction to the second group of components via said bus device when said bus code carried by said transaction has a second value.

13. The bus controller according to claim 12 wherein said bus device includes a first bus and a second bus that are indicated as an upper-level bus that the first group of components is coupled to and a lower-level bus that the second group of components is coupled to by said bus controller main circuit and said virtual bridge device, respectively, in response to a bus configuration cycle asserted by an operating system via the central processing unit.

14. The bus controller according to claim 13 wherein the first group of components comprises at least one internal component selected from a group consisting of an AC97 audio chip, a serial ATA control chip and a USB control chip and the second group of components comprises at least one external PCI device.

15. The bus controller according to claim 13 wherein said path selection unit is electrically connected to and among said bus controller main circuit, said upper-level bus and second lower-level bus.

16. The bus controller according to claim 15 wherein said path selection unit outputs a normal device select signal to said upper-level bus while outputting an invalid device select signal to said lower-level bus when said bus code has said first value, and said path selection unit outputs a normal device select signal to said lower-level bus while outputting an invalid device select signal to said upper-level bus when said bus code has said second value.

17. The bus controller according to claim 16 wherein said transaction further carries a device code, and said normal device select signal corresponds to said device code while said invalid device select signal corresponds to a change to said device code.

18. The bus controller according to claim 17 wherein said invalid device select signal includes a plurality of bits corresponding to said device code, which are zeroed.

19. The bus controller according to claim 12 wherein said virtual bridge device is implemented with a set of registers storing therein configuration header data of a physical PCI-to-PCI bridge device.

20. A bus control method for use in a computer system, the computer system comprising a central processing unit, a bus controller main circuit, a virtual bridge device, a first group of components, and a second group of components, the bus control method comprising:

the bus controller main circuit indicating the presence of a first-level bus that the first group of components is coupled to;

the virtual bridge device indicating the presence of a second-level bus that the second group of components is coupled to in response to a bus configuration cycle asserted when the computer system is initialized;

outputting a normal select signal to said first-level bus when the address data of a transaction received by the bus controller main circuit indicates a bus code of said first-level bus; and outputting a normal select signal to said second-level bus when the address data of a transaction received by the bus controller main circuit indicates a bus code of said second-level bus.

21. The method according to claim 20 further comprising:

outputting an invalid select signal to said first-level bus when the address data of a transaction received by the bus controller main circuit indicates a bus code of said second-level bus; and outputting an invalid select signal to said second-level bus when the address data of a transaction received by the bus controller main circuit indicates a bus code of said first-level bus.

22. The method according to claim 20 wherein said virtual bridge device is implemented with a set of registers storing therein configuration header data of a physical PCI-to-PCI bridge device.

* * * * *